United States Patent
Elshaer et al.

(10) Patent No.: US 10,040,358 B2
(45) Date of Patent: Aug. 7, 2018

(54) WIRELESS POWER TRANSFER FOR VEHICLES

(71) Applicant: Ford Global Technologies, LLC, Dearborn, MI (US)

(72) Inventors: Mohamed Elshaer, Dearborn, MI (US); Christopher W. Bell, Livonia, MI (US); James A. Lathrop, Saline, MI (US); John Paul Gibeau, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 18 days.

(21) Appl. No.: 15/180,762

(22) Filed: Jun. 13, 2016

(65) Prior Publication Data
US 2017/0355270 A1    Dec. 14, 2017

(51) Int. Cl.
| | |
|---|---|
| H02J 7/00 | (2006.01) |
| H02J 7/04 | (2006.01) |
| H02J 7/16 | (2006.01) |
| B60L 11/18 | (2006.01) |
| H02J 7/02 | (2016.01) |
| H02M 1/42 | (2007.01) |
| H02M 3/155 | (2006.01) |
| H02M 3/28 | (2006.01) |
| H02M 1/00 | (2006.01) |

(52) U.S. Cl.
CPC ............ *B60L 11/182* (2013.01); *H02J 7/025* (2013.01); *H02M 1/42* (2013.01); *H02M 3/155* (2013.01); *H02M 3/28* (2013.01); *H02M 1/4225* (2013.01); *H02M 2001/007* (2013.01)

(58) Field of Classification Search
CPC ........................................................ H02J 7/025
USPC ........................................................ 320/108
See application file for complete search history.

(56) References Cited

U.S. PATENT DOCUMENTS

| | | | |
|---|---|---|---|
| 8,796,887 B2 | 8/2014 | Von Novak et al. | |
| 2014/0375256 A1 | 12/2014 | Lee et al. | |
| 2016/0001662 A1 | 1/2016 | Miller et al. | |
| 2016/0094081 A1* | 3/2016 | Lee ......................... | H02J 5/005 |
| | | | 320/108 |

\* cited by examiner

*Primary Examiner* — Edward Tso
*Assistant Examiner* — Ahmed Omar
(74) *Attorney, Agent, or Firm* — Brooks Kushman P.C.

(57) ABSTRACT

An inductive charge system may include an inductive charging circuit having a switchgear configured to swap between a step-up converter and a step-down converter. The inductive vehicle charge station or system may include a controller configured to operate the switchgear to switch between the step-up converter and the step-down converter based on presence or absence of a load. The step-up converter may be a boost converter. The step-down converter may be a buck converter. The buck converter may have a maximum power output of 100 W. An output of the step-down converter may include a forward-biased diode to prevent backfeeding. The controller may be further configured to ramp an output voltage of the step-down converter from a coupling voltage to a charging voltage to prevent hard switching between the step-up converter and the step-down converter.

18 Claims, 3 Drawing Sheets

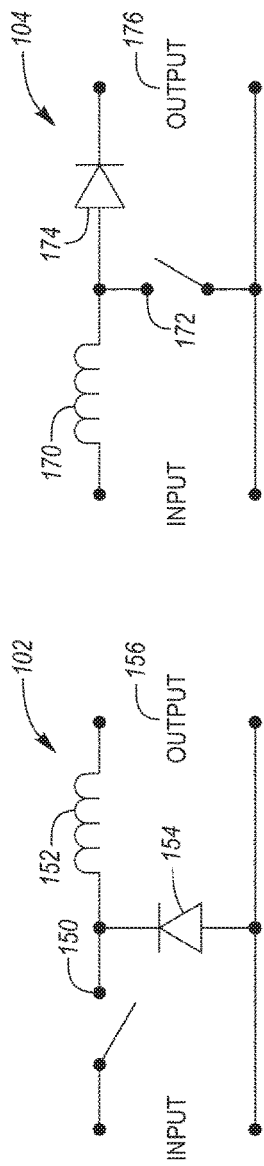
FIG. 3A
FIG. 3B
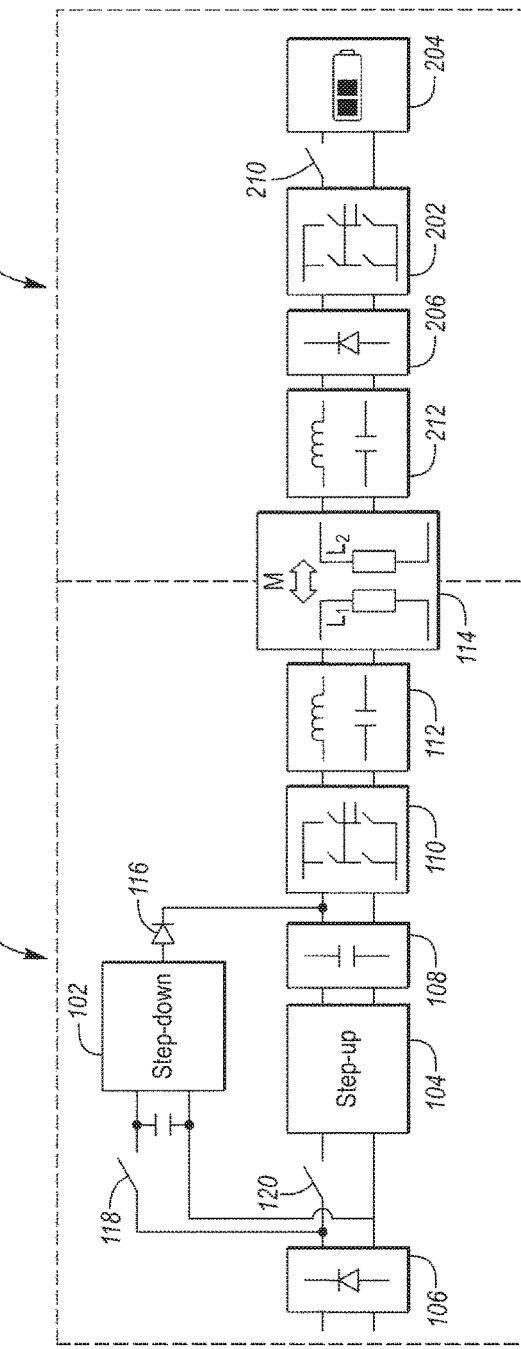
FIG. 4

WIRELESS POWER TRANSFER FOR VEHICLES

TECHNICAL FIELD

The present disclosure relates to wireless power transfer for vehicles.

BACKGROUND

Electric or hybrid-electric vehicles are periodically recharged to replenish electric power sources. The vehicles are typically recharged using a direct connection or wireless power transmission. A primary or power source side of a wireless power transmission system may generate electric and magnetic fields. Guidelines and regulations have been implemented to govern exposure to these energy fields.

SUMMARY

An inductive charge system may include an inductive charging circuit having a switchgear configured to swap between a step-up converter and a step-down converter. The inductive vehicle charge station or system may include a controller configured to operate the switchgear to switch between the step-up converter and the step-down converter based on presence or absence of a load. The step-up converter may be a boost converter. The step-down converter may be a buck converter. The buck converter may have a maximum power output of 100 W. An output of the step-down converter may include a forward-biased diode to prevent backfeeding. The controller may be further configured to ramp an output voltage of the step-down converter from a coupling voltage to a charging voltage to prevent hard switching between the step-up converter and the step-down converter. A charging voltage of the battery and an output voltage of the step-up converter may be same. The controller may be further configured to ramp an output voltage of the step-down converter to a battery voltage to prevent hard switching when a battery on a secondary side of the inductive charging circuit is connected. The step-up converter may be a power factor correction (PFC) boost converter.

BRIEF DESCRIPTION OF THE DRAWINGS

FIG. 3A depicts a step-down or buck converter;

FIG. 3B depicts a step-up or boost converter;

FIG. 4 depicts a primary side and secondary side of an inductive charging system.

DETAILED DESCRIPTION

Figure 1:
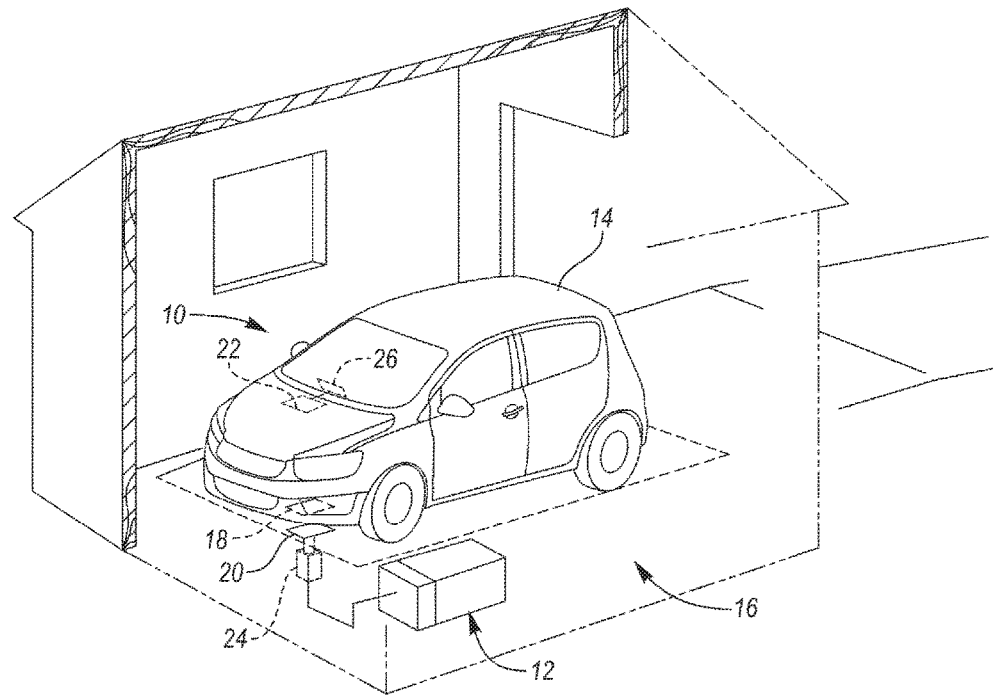
FIG. 1 depicts a vehicle near a charging station having a primary side.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Vehicles can be powered by battery electricity (BEVs) as well as by a combination of power sources including battery electricity. For example, hybrid electric vehicles (HEVs) are contemplated in which the powertrain is powered by both a battery and an internal combustion engine. In these configurations, the battery is rechargeable and a vehicle charger provides power to restore the battery after discharge.

An electric vehicle may be charged via an inductive charging circuit. The inductive charging circuit may include a primary side and secondary side. The primary side refers to the circuit connecting the electric utility grid to the primary coil. The secondary side refers to the circuit connecting the secondary coil to the vehicle battery bus. The inductive charging circuit may include a switchgear or set of controlled switches for swapping between a step-up converter and a step-down converter. The controller may be configured to selectively operate the switchgear to switch between the step-up converter and the step-down converter based on the presence or absence of a load. The load may be recognized through data communications between the vehicle and the primary side controller. The vehicle may have a communications controller to sense the amount of power transferred to the secondary coil. The vehicle may send this information to the primary side controller, where the primary side controller can determine the coupling coefficient in relation to the power supplied to the primary coil.

The step-up converter may be a boost converter. The step-up converter may be a buck-boost converter. The step-up converter may provide power factor correction to maintain a desirable power factor (i.e., real power transfer). The step-down converter may be a buck converter. The step-down converter may be a linear voltage converter as well. For example, the step-down converter may include a Zener diode or voltage divider configuration. The step-down converter may have a maximum power output of 100 Watts. The step-down converter may have a lower maximum than 100 Watts. The step-down converter power output may be rated only to an amount sufficient to ensure adequate coupling and power to balance the voltage with the battery and step-up converter, as described herein. The step-down converter may include a forward biased diode to prevent backfeeding.

Due to the nature of the switches on the primary side and secondary side the controller may be configured to change the power output and voltage output of the step-down converter to prevent hard switching when higher voltage devices are connected to the circuit. For example, a battery bus of the vehicle may have a higher voltage than what is necessary to facilitate alignment of the primary and secondary side coils. Prior to closing the circuit, the step-down converter may increase its power output to raise the secondary side voltage to a level similar to that of the battery bus.

With reference to FIG. 1, a vehicle charge system is illustrated in accordance with one or more embodiments and is generally referenced by numeral 10. Induction charging is used to provide power from a vehicle charger 12 to a vehicle 14 in order to restore the battery. A charging station 16 is shown accommodating the vehicle 14 to be charged through induction charging. The vehicle 14 docks at the charging station 16, which houses the vehicle charger 12. The vehicle charger 12 can be connected to receive household electrical current, such as that available within a typical home garage.

The vehicle 14 includes a secondary coil housed within an induction charge plate 18 disposed on the underside of the vehicle 14. The vehicle secondary induction charge plate 18 is electrically connected to the vehicle battery. The vehicle 14 also includes an AC to DC power converter in order to rectify and filter the AC power received from the vehicle charger 12 into DC power to be received by the battery. The vehicle charger 12 is disposed in the floor beneath the vehicle 14, and includes a primary charging coil housed within a corresponding primary induction charging plate 20. The primary induction charging plate 20 is generally horizontal and positioned at a distance from the vehicle secondary induction charge plate 18. The primary induction charging plate 20 can be articulable in height to create a suitable gap to facilitate charging of the vehicle 14. Electrical current is provided to the primary coil, which generates an electromagnetic field around the primary induction charging plate 20. When the vehicle secondary induction charge plate 18 is in proximate relation to the powered primary induction charging plate 20, it receives power by being within the generated electromagnetic field. Current is induced in the secondary coil and subsequently transferred to the vehicle battery, causing a recharging effect. The gap between the plates allows for variation in vehicle alignment, and also for accommodation of alternate authorized vehicles with differing ride heights.

In an alternative embodiment (not shown), the charging station primary induction charging plate is configured to be in a generally vertical position, for example on or near an upright wall. The vehicle would have a corresponding secondary induction charge plate on a front or rear vertical portion, for example as part of a front or rear bumper. The primary and secondary primary induction charging plates come in to a proximate relation when the vehicle is driven to the charge station, and parked in a designated charging position. Partly related to variation of the park position of the vehicle, an intentional gap would again be provided between the primary and secondary induction charge plates.

Figure 2:
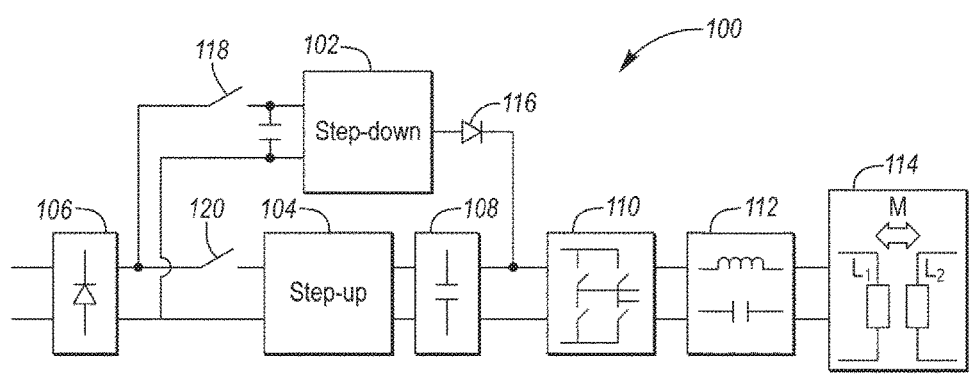
FIG. 2 depicts a primary side of a vehicle charging station or system.

Now referring to FIG. 2, a primary side 100 of the inductive charging system is shown. The primary side includes a rectifier 106 that converts the alternating current source to a time-varying unipolar signal. In the absence of a load, the primary system 100 is configured with switch 118 closed. Switch 118 closes the circuit for the step-down converter 102 to be used. The step-down converter reduces power output of the primary inductive coil 114 to limit electromagnetic radiation. The step-down converter may have a maximum output of around 50 Watts. The step-down converter may be a buck converter, which uses inductance to limit the rate of change of current passing through the inductor. Other linear regulators may be used to step-down the source voltage (e.g., shunt regulator or series regulator employing a Zener diode). The step-down signal is used to power the inverter 110. The inverter 110 may generate a waveform between 80.13 kHz and 90 kHz—preferably 85 kHz—as required by The Society of Automotive Engineers. A compensation network 112 may be introduced to improve the efficiency of the power transfer. The compensation network 112 may be unilateral or bilateral and in series or parallel.

The presence of a vehicle may be determined by data communications, proximity detection, or coupling coefficient measurement. Upon detection of the vehicle, a controller may selectively operate a switch gear to switch between the step-up converter 102 and the step-down converter 104. Meaning, the controller may switch in the step-up converter 104 by closing switch 120. The controller may leave the step-down converter 102 switch 118 closed until the step-up converter 104 circuit is closed by switch 120. The step-down converter 102 may be ramped up to the operating voltage of the step-up converter 104. The step-up converter's output voltage may be greater than the peak input AC line voltage. Typically, the operating voltage of the step-up converter is 400-450 Volts. Although the step-down converter 102 does not have the capacity to power the full load, it is capable of increasing its output voltage to match the step-up converter's 104 output to ensure a soft switch. After the circuit including the step-up converter 104 is closed, the step-down converter 102 switch 118 may be opened. The step-down converter 102 circuit includes a one-way diode 116 to ensure the step-up converter 104 does not backfeed the step-down converter 102 when both circuits are closed. The step-up converter 104 circuit includes an energy storage capacitor to regulate the output of the step-up converter. The switch between converters may happen without the ramping and occur upon indication of a load being present.

Now referring to FIG. 3A, a buck converter or step-down converter 102 is depicted having a switch 150 to control output current, a diode 154 to regulate the flow of current, an inductor 152 to limit the rate of change of the current using a magnetic field, and an output 156. As shown in FIG. 3B, a boost converter or step-up converter 104 is shown. The step-up converter has an inductor 170 to limit the rate of change of the current using a magnetic field, a switch 172 to control output current, a diode 174 to control electron flow through the circuit, and an output 176. The switches 150, 170 may be controlled with a controller to properly regulate the output of each converter.

Now referring to FIG. 4, a primary side 100, as discussed above, and secondary side 200 are depicted. The primary side 100 and secondary side 200 are coupled using respective inductive coils 114. The secondary side 200 includes a compensation network 212, rectifier 206 and impedance converter 202. The step-down converter 102 may be used to raise the secondary side voltage to prevent hard switching when switch 210 is closed to connect the battery 204. For example, the step-down converter 102 can be used to supply power to the inverter 110 to raise the secondary side voltage to the battery terminal voltage or battery electric bus voltage.

Figure 5:
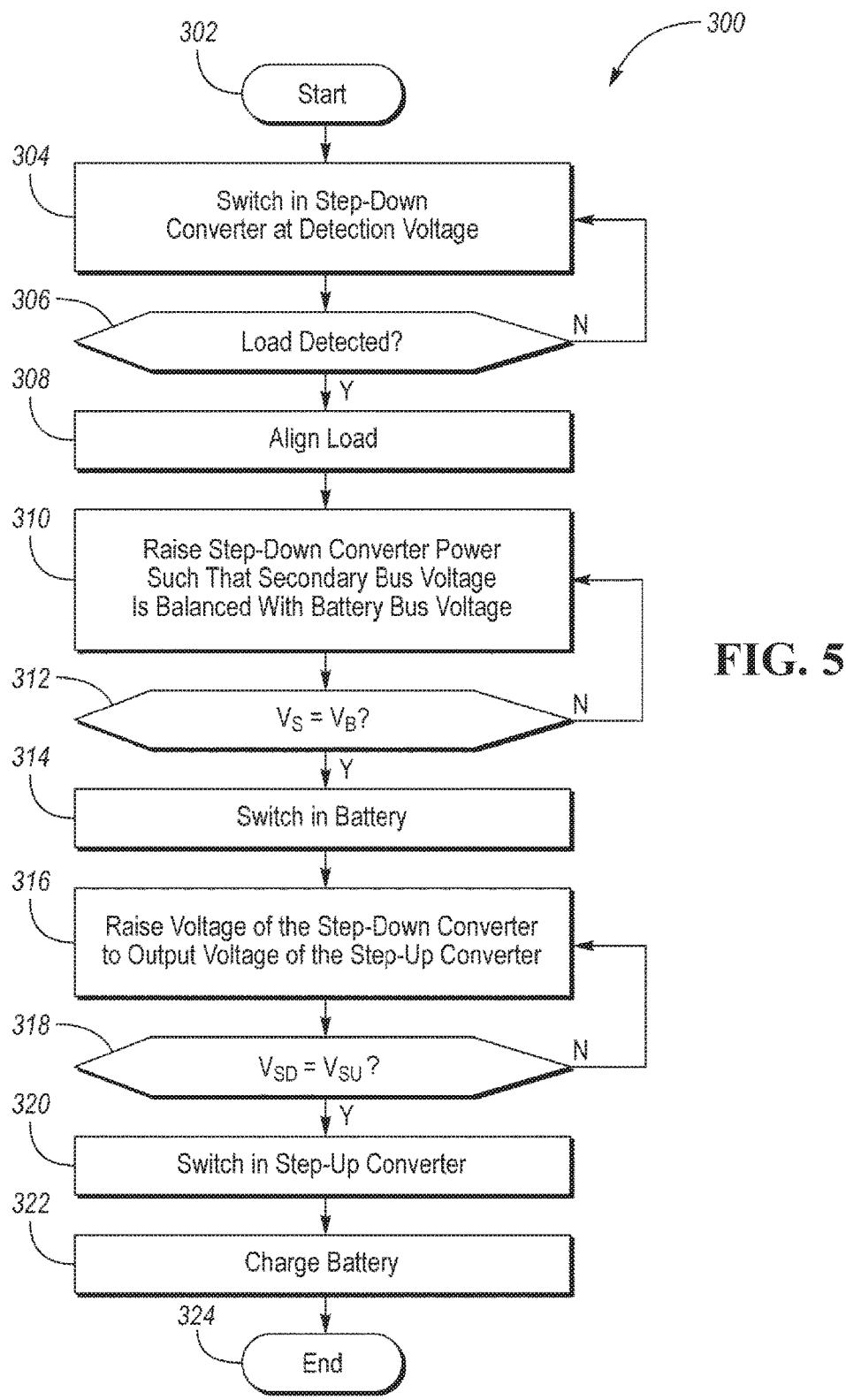
FIG. 5 is a flow diagram of an inductive charging system.

Now referring to FIG. 5, a flow process 300 is shown for the wireless power transfer system. At step 302, the process commences. At step 304 the step-down converter is switched in to cause low-power inductance from the primary coil. In step 306, a detection is performed by either direct communication with the vehicle and a calculation or estimation of the coupling coefficient based on a position of the vehicle. The load is aligned in step 308. In step 310, the controller may raise the step-down converter power such that the secondary bus voltage is balanced with an unconnected battery bus voltage to prevent arcing caused by large differences in voltage between the battery bus and secondary circuit junction. In step 312 the controller waits until the secondary circuit's voltage is balanced with the battery bus voltage. The step-down converter voltage may be raised by increasing the pulse width or frequency of the signal sent to the switch of the buck converter. After the voltages are balanced, the controller closes the switch to connect the secondary circuit and the battery in step 314. In step 316 the step-down converter raises its output voltage by increasing the pulse width of the switch signal. The step-down converter output voltage is mapped to the nominal output voltage of the step-up converter. In step 318, the controller hangs until the voltage output of the step-down converter is equal to the voltage of the step-up converter. Once the voltages are balanced, the high power step-up converter circuit is closed in step 320. The battery is then charged in step 322. The process may end 324. The process may also repeat all or a portion of the process to properly provide adequate power transfer when a load is present and minimal electromagnetic radiation when a load is not present.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. An inductive charge system comprising:
   an inductive charging circuit including a switchgear configured to swap between a step-up converter and a step-down converter that has an output that includes a forward-biased diode to prevent backfeeding; and
   a controller configured to operate the switchgear to switch between the step-up converter and the step-down converter based on presence or absence of a load.

2. The system of claim 1, wherein the step-up converter is a boost converter.

3. The system of claim 1, wherein the step-down converter is a buck converter.

4. The system of claim 3, wherein the buck converter has a maximum power output of 100 W.

5. The system of claim 1, wherein the controller is further configured to ramp an output voltage of the step-down converter from a coupling voltage to a charging voltage to prevent hard switching between the step-up converter and the step-down converter.

6. The system of claim 5, wherein the charging voltage and an output voltage of the step-up converter are same.

7. The system of claim 1, wherein the controller is further configured to ramp an output voltage of the step-down converter to a battery voltage to prevent hard switching when a battery on a secondary side of the inductive charging circuit is connected.

8. The system of claim 1, wherein the step-up converter is a power factor correction boost converter.

9. A system comprising:
   an inductive charging circuit including a switchgear configured to swap between a power converter and a power factor correction (PFC) converter; and
   a controller configured to, in response to a load being present, operate the switchgear to switch-in the PFC converter and switch-out the power converter, and in response to absence of a load, operate the switchgear to switch-in the power converter and switch-out the PFC converter.

10. The system of claim 9, wherein the PFC converter is a boost converter.

11. The system of claim 10, wherein the power converter is a buck converter.

12. The system of claim 11, wherein the buck converter has a maximum power output of 100 W.

13. The system of claim 12, wherein an output of the buck converter includes a forward-biased diode to prevent backfeeding.

14. The system of claim 13, wherein the controller is further configured to ramp an output voltage of the buck converter from a coupling voltage to a charging voltage to prevent hard switching between the boost converter and the buck converter.

15. The system of claim 14, wherein a charging voltage of a battery and an output voltage of the boost converter are same.

16. The system of claim 15, wherein the controller is further configured to ramp an output voltage of the of the buck converter to a battery voltage to prevent hard switching when the battery on a secondary side of the inductive charging circuit is connected.

17. A method of charging a vehicle using an inductive vehicle charge station comprising:
   swapping between a step-up converter and a step-down converter of an inductive charging circuit with a switchgear;
   operating the switchgear to switch between the step-up converter and the step-down converter based on the presence or absence of a load; and
   increasing an output voltage of the step-down converter to a battery voltage to prevent hard switching when the battery on a secondary side of the inductive charging circuit is connected.

18. The method of claim 17 further comprising increasing an output voltage of the step-down converter from a coupling voltage to a charging voltage to prevent hard switching caused by swapping between the step-up converter and the step-down converter.

* * * * *